May 25, 1937. A. C. FISCHER Re. 20,376

REENFORCED CONCRETE ROAD CONSTRUCTION

Original Filed Nov. 29, 1926

Inventor:
Albert C. Fischer:
By William H. Knight
Atty

Reissued May 25, 1937

Re. 20,376

UNITED STATES PATENT OFFICE 20,376

REENFORCED CONCRETE ROAD CONSTRUCTION

Albert C. Fischer, Chicago, Ill., assignor to The Philip Carey Manufacturing Company, a corporation of Ohio Original No. 2,015,340, dated September 24, 1935, Serial No. 151,412, November 29, 1926. Application for reissue February 25, 1936, Serial No. 65,730

21 Claims. (Cl. 94—18)

My invention relates in general to concrete or the like road construction, and has particular reference to the reenforcement of the concrete in such a construction, as well as the provision for contraction joints.

The primary object of my invention is to combine the reenforcing structure and the contraction joint structure in such a way that one will cooperate with the other to not only facilitate building of the roadway, but also to realize the best results from materials used.

In the accompanying drawing I have illustrated the salient features of the invention, and in which Figure 1 is a perspective view showing a combined arrangement between a separating strip for contraction purposes and the reenforcing rods.

Figure 1:
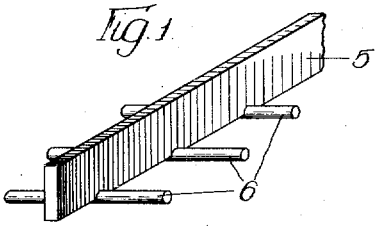
Figure 2:
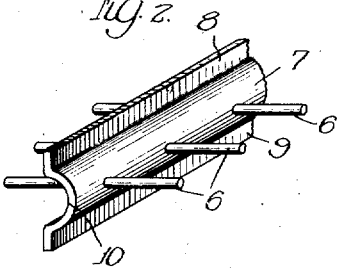
Figure 2 is a similar view showing a modified form of separating strip.

Referring now to the drawing in detail, I provide a separating strip 5, preferably of metal, which is vertically supported by and welded to the reenforcing bars 6. Or else in lieu of the strip 5 I may employ a tongue and groove structure 7, which is in the form of a strip, having upper and lower flat portions 8 and 9, yoked together by an intermediate tongue and groove 10. In this structure the reenforcing rod 6 would project thru the intermediate tongue and groove. Either of these forms may be used in combination with the grill work 11, by providing metal cuplike sockets 12 and welding the same to the grill so that the ends of the reenforcing rods 6 are received therein as a means of supporting and connecting the separating strip and the rods to the grill. To compensate for expansion and contraction the rods 6 are inserted only a limited extent in the sockets 12, so that the space remaining may be filled with yieldable, compressible material 13. With this construction the grill work 11 on opposite sides of the separating strip may function to its intended capacity, and the separating strip 5 will likewise operate to make a line of weakness, so that upon expansion and contraction of the concrete any cracks tending to occur will be in alignment with the separating strip.

When the tongue and groove separating strip is used the tongue and groove structure of the same will interlock the concrete together on opposite sides of the strip, so that when the cracks occur in alignment with the separating strip the tongue and groove will prevent the divided sections thus formed from riding one upon the other.

The welding between the separating strip 5 and the reenforcing bars 6 typifies any suitable means for fixedly attaching the members together as a unitary structure so that they are not readily detachable from each other as distinct from a structure in which the reenforcing bars are made in sections with the separating strip clamped between said sections, and the sections and separating strip are held assembled by a nail or screw and disassembled by removing the nail or unfastening the screw.

Figure 3:
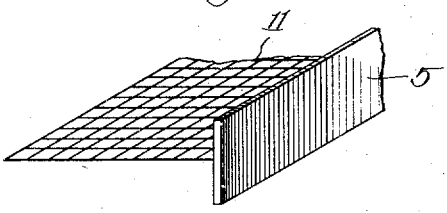
Figure 3 is a perspective view of a portion of the reenforcing grill combined with a separating strip.
Figure 4:
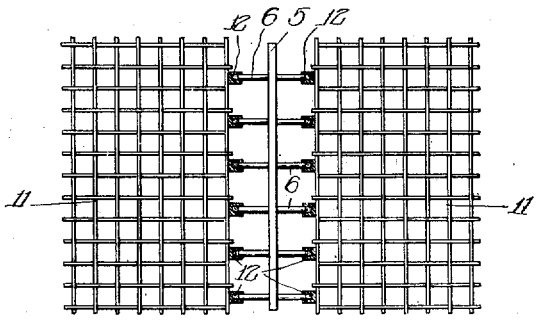
Figure 4 is a plan view showing the separating strip combined with the reenforcing grill and in combination with reenforcing rods.
Figure 5:
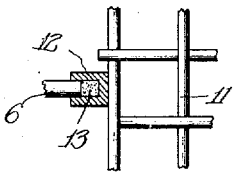
Figure 5 is a detailed view in plan showing the connection between the grill and the supports for the reenforcing rods.
Figure 6:
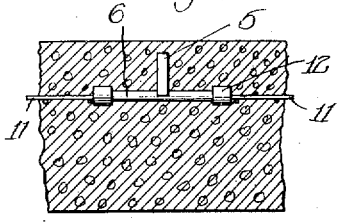
Figure 6 is a detailed view in vertical section showing the separating strip and the grill as incorporated in the concrete structure of the roadway.

As a modified form of the same principle the separating strip 5 may be used without the reenforcing rods 6, in which event it would be welded directly to the grill work 11, as shown in Figure 3.

I claim:

1. In a concrete road, sections of grill work embedded horizontally in the concrete and said grill sections being yoked together by reenforcing bars, and a separating strip having its bottom edge resting on said bars.

2. In a concrete road, sections of grill work embedded horizontally in the concrete and said grill sections being yoked together by reenforcing bars, and a separating strip vertically supported by said bars entirely above the grill work.

3. In a concrete road, sections of grill work embedded horizontally in the concrete, sockets projecting from the confronting ends of the grill work sections, reenforcing bars inserted in said sockets and bridging the space between the grill sections, and a separating strip supported by said bars substantially intermediate the ends thereof.

4. In a concrete road, sections of grill work embedded horizontally in the concrete, sockets projecting from the confronting ends of the grill work sections, reenforcing bars inserted in said sockets and bridging the space between the grill sections, and a separating strip supported by said bars substantially intermediate the ends thereof, the inserted ends of said bars terminating short of the attached ends of the sockets and leaving spaces in the sockets in which the rods may slide upon expansion and contraction of the concrete.

5. In a concrete road, sections of grill work embedded horizontally in the concrete, sockets projecting from the confronting ends of the grill work sections, reenforcing bars inserted in said sockets and bridging the space between the grill sections, and a separating strip supported by said bars substantially intermediate the ends thereof, the inserted ends of said bars terminating short of the attached ends of the sockets and leaving spaces in the sockets, said spaces being filled with compressible material, and the rods being adapted to slide in the sockets against said compressible material substantially as/and for the purpose described.

6. In a concrete road, sections of grill work embedded horizontally in the concrete, rods attached to the grill sections, and a joint defining strip secured in place entirely above said rods.

7. A concrete surfacing structure having reenforcement sections embedded therein, and a joint defining strip extending over said reenforcement, the reenforcement including rods for holding the strip in place entirely above said reenforcement.

8. A concrete surfacing structure reenforcement comprising grill sections, and a joint defining strip extending thereover, said reenforcement including rods for holding the strip in place entirely above said reenforcement.

9. A concrete surfacing structure having joint means and reenforcement grill sections embedded therein, said reenforcement including rods attached to said grill sections and engaging said joint means for holding same in position entirely above said reenforcement.

10. In a concrete road, grill sections embedded horizontally in the concrete, reenforcing bars interposed between the grill sections, a separating strip supported by the grill sections, and a compression and expansion means associated with the reenforcing bars.

11. A joint unit for separating spaced apart sections comprising a strip having one or more reenforcing bars fixedly attached thereto to assemble said strip and reenforcing bar or reenforcing bars together as a unitary structure.

12. A joint unit for separating spaced apart sections comprising a metal strip having one or more reenforcing bars welded thereto to assemble said strip and reenforcing bar or reenforcing bars together as a unitary structure.

13. A paving construction comprising sections spaced apart to provide a joint space, a separating strip inserted within the space, and a reenforcing bar or reenforcing bars fixedly attached to the strip for assembling same together as a unitary structure.

14. A paving construction comprising sections spaced apart to provide a joint space, a metal separating strip inserted within the space, and a reenforcing bar or reenforcing bars welded to the strip for assembling same together as a unitary structure.

15. A paving construction comprising sections spaced apart to provide a joint space, a strip arranged within the space, a reenforcing bar fixedly attached to the strip and extending from opposite sides thereof into the adjacent sections.

16. A paving construction comprising sections spaced apart to provide a joint space, a strip inserted within the space, members fixed to the strip and arranged to extend outward from the opposite sides thereof into the adjacent sections of the paving construction.

17. A paving construction comprising sections spaced apart to provide a joint space, a strip inserted within the space, members fixed to the strip and arranged to extend outward in line with each other from the opposite sides thereof into the adjacent sections of the paving construction.

18. In a concrete road comprising a layer of concrete having reenforcing bars embedded therein, a separating strip fixedly attached to said bars to form a unitary structure, and compression and expansion means positioned adjacent the unitary structure to provide for contraction and expansion between it and the concrete layer.

19. A joint unit for separating spaced apart sections comprising a metal strip having one or more reenforcing bars adhered thereto for assembling said strip and bar or bars together as a unitary structure in which said strip and bar or bars are not readily detachable.

20. A joint unit for separating spaced apart sections comprising a strip having one or more reenforcing bars fixedly attached thereto to assemble said strip and reenforcing bar or bars together as a unitary structure in which said strip and bar or bars are not readily detachable from each other.

21. A paving construction comprising sections spaced apart to provide a joint space, a separating strip inserted within the space, and a reenforcing bar or bars fixedly attached to the strip for assembling same together as a unitary structure in which said strip and bar or bars are not readily detachable from each other.

ALBERT C. FISCHER.